(12) United States Patent
Osawa

(10) Patent No.: US 6,585,919 B1
(45) Date of Patent: Jul. 1, 2003

(54) METHOD AND APPARATUS FOR INJECTION MOLDING WHEREIN CYCLE TIME IS CONTROLLED

(75) Inventor: Kazuki Osawa, Chita (JP)

(73) Assignee: Kabushiki Kaisya Meiki Seisakusyo, Obu (JP)

( * ) Notice: Subject to any disclaimer, the term of this patent is extended or adjusted under 35 U.S.C. 154(b) by 342 days.

(21) Appl. No.: 09/644,643

(22) Filed: Aug. 24, 2000

(30) Foreign Application Priority Data

Sep. 13, 1999 (JP) .......................................... 11-258800

(51) Int. Cl.$^7$ ............................................... B29C 45/76
(52) U.S. Cl. ................... 264/40.1; 264/328.1; 425/155; 425/542
(58) Field of Search ............................ 264/40.1, 328.1; 425/135, 155–160, 542

(56) References Cited

U.S. PATENT DOCUMENTS

| 3,574,896 A | * | 4/1971 | Fernholz ..................... 425/160 |
| 3,797,808 A | * | 3/1974 | Ma et al. ..................... 425/145 |
| 4,208,176 A | * | 6/1980 | Salerno ....................... 425/139 |
| 4,849,143 A | * | 7/1989 | Langecker .................. 264/40.1 |
| 5,200,126 A | * | 4/1993 | Wenskus et al. ........... 264/40.1 |
| 5,344,301 A | * | 9/1994 | Kamiguchi et al. ........ 264/40.1 |
| 5,411,686 A | * | 5/1995 | Hata ....................... 264/328.14 |

\* cited by examiner

Primary Examiner—Jill L. Heitbrink
(74) Attorney, Agent, or Firm—Oliff & Berridge, PLC

(57) ABSTRACT

Injection molding method and apparatus for repeatedly performing an injection molding cycle including the steps of closing and clamping a mold having a mold cavity, injecting a resin material into the mold cavity, cooling and solidifying the resin material filling the mold cavity, and opening the mold so as to remove a molded product, in order to successively form the molded product, wherein a cycle time is measured at a measuring point in the injection molding cycle, and a difference between the measurement of the cycle time and a predetermined reference cycle time is obtained, and then a time compensation on the basis of the difference is executed at a time-controlled step which is arranged to be executed before the next measuring point comes.

13 Claims, 2 Drawing Sheets

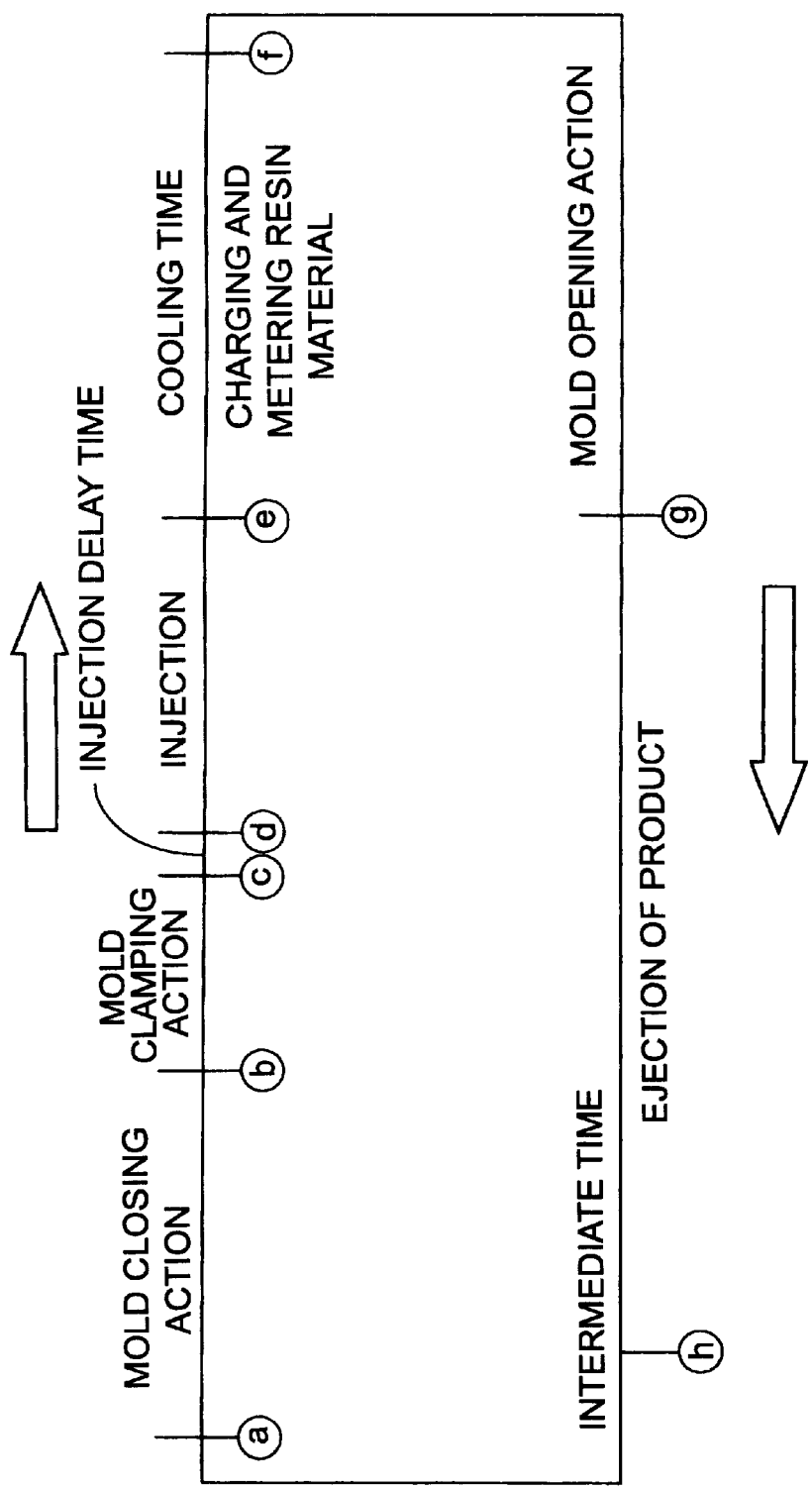

METHOD AND APPARATUS FOR INJECTION MOLDING WHEREIN CYCLE TIME IS CONTROLLED

This application is based on Japanese Patent Application No. 11-258800 filed on Sep. 13, 1999, the contents of which are hereby incorporated by reference.

BACKGROUND OF THE INVENTION

1. Field of the Invention

The present invention relates generally to a method and an apparatus of an injection molding, which are arranged to successively mold articles made of a resin material. More particularly, the present invention is concerned with a novel method and a novel apparatus of an injection molding, which assure a sufficiently high degree of stability of a heat history of the resin material and a temperature of a mold, in every molding cycle, while permitting an execution of a successive injection molding of the resin material with high stability.

2. Description of the Related Art

As one type of an injection molding machine, there is known an injection molding machine, such as an inline-screw-type injection molding machine, a plunger-type (torpedo-type) injection molding machine and a preplasticating injection molding machine, wherein an injection screw or plunger which is reciprocally movably disposed in a bore of a heating cylinder is rotated so that a resin material is heated to be molten and metered in the heating cylinder. Successively, the injection screw or plunger is moved so as to inject the resin material into a mold cavity of a mold which is clamped by a suitable clamping device. The resin material filling the mold cavity is held within the cavity under a predetermined holding pressure and then cooled for a predetermined period of time. Then, the mold is opened and the molded product is ejected or released from the mold cavity, thereby obtaining a desired molded product. Such an injection molding machine is operated to perform repeatedly a cycle of molding operations so as to successively form a multiplicity of desired products.

In order to produce successively the desired products with a desired good quality, by means of the injection molding machine, there is required that a molding condition is kept substantially constant in every molding cycle. In particular, it is important that a heat history of the resin material and a temperature of the mold are kept substantially constant in every molding cycle.

However, one molding cycle includes various kinds of steps such as a cooling step wherein a time of the step is controlled, a mold closing and opening step wherein an operation velocity of the injection molding machine is controlled by adjusting an amount of discharge of a hydraulic pump, and an injection step wherein an injection pressure or a position of the injection screw are controlled. Therefore, it is difficult to keep the injection molding condition substantially constant, and a conventional injection molding machine inevitably is likely to suffer from variation in heating conditions and heating times of the resin material or the mold, leading to difficulty in keeping the heat history of the resin material and the temperature of the mold substantially constant in the every molding cycle, upon performing the above-indicated successive injection molding. Due to this drawback, the conventional injection molding machine may be insufficient in attaining a desired degree of stability in quality of the products, depending on kinds of the products.

SUMMARY OF THE INVENTION

It is therefore a first object of the present invention to provide a method of injection molding for successively producing a resin product by repeatedly performing an injection molding cycle, which method permits a high degree of stability of molding conditions in terms of a heat history of a resin material and a temperature of a mold, in every molding cycle, thereby permitting successive production of the resin products with a stabilized quality thereof.

It is a second object of the invention to provides an injection molding apparatus which is novel in construction and which permits that molding conditions such as a heat history of a resin material and a temperature of a mold are kept substantially constant, during its successive injection molding operation, thereby permitting a successive production of desired resin products with a stabilized quality thereof.

The first object may be achieved according to a first aspect of this invention, which provides a method of injection molding for repeatedly performing an injection molding cycle including the steps of closing and clamping a mold having a mold cavity, injecting a resin material into the mold cavity, cooling and solidifying said resin material filling the mold cavity, and opening the mold so as to remove a molded product, in order to successively form the molded product, the method comprising the steps of: (a) measuring a cycle time at at least one measuring point in the injection molding cycle to thereby obtain a measurement of the cycle time; (b) obtaining a difference between the measurement of the cycle time and a predetermined reference cycle time; and (c) executing a time compensation on the basis of the difference at a time controlled step which is arranged to be executed before the next measuring point comes.

In the injection molding method according to the first aspect of the invention, the entire time required to execute one injection molding cycle is suitably controlled to be made substantially constant, although the injection molding cycle includes steps which are not controlled based on time. Therefore, the present method is capable of restricting or reducing an amount of variation in the cycle time of each injection molding cycle, making it possible that a period of time required from a current injection action to a next injection action is kept substantially constant. Thus, the present method permits a substantially constant molding conditions in terms of the heat history of the resin material and the temperature of the mold, in the every molding cycle.

For the above reasons, the present injection molding method assures an improved stability in quality of the products formed by the successive injection molding, while effectively attaining a sufficiently reduced ratio of reject of the molded product and an improved yield of the molded product.

It is noted that the measuring point for measuring the cycle time may be previously fixed to a point or points in the injection molding cycle, but not particularly limited. For instance, the measuring point may preferably be set to any point in the cycle at which an electric signal is generated. In this case, the electric signal is advantageously utilized to measure the cycle time. More specifically, the measuring point is set to a point in the cycle at which the injection molding cycle changes its steps. Namely the point may preferably be an initiation or a completion point of a mold clamping operation, an initiation or a completion point of an injection operation, for example. In this respect, the electric signal may be an output signal of a positioning sensor like a limit switch, an output signal of a timer or a time counter, for example.

The reference cycle time may be set to a desired value by a manual operation. It is preferable that the cycle time is timed in every molding cycle and if a desired product is obtained, then the timed cycle time is set as the reference cycle time. It is noted that the reference cycle time may be suitably changed taken into account molding conditions or the like.

The time compensation based on the obtained difference between the measurement of the cycle time and the reference cycle time may be executed at any one or more of the time controlled step(s) in the injection molding cycle. In this respect, the time controlled step should be interpreted as a step wherein a time or period of the step is controlled. For an effective time compensation, the time compensation is executed as follows: In this case where an injection molding cycle includes a plurality of measuring points for measuring the cycle time, if the difference is obtained in a current measuring point, then the time compensation based on the obtained difference should be executed until the next measuring point comes. In this case where an injection molding cycle include one measuring point for measuring the cycle time, if the difference is obtained in the measuring point in the current cycle, then the time compensation based on the obtained difference is executed until the measuring point in the next cycle comes.

In one preferred form of the method of the present invention, the time controlled step at which the time compensation is executed, may be selected from the group consisting of (i) an injection delay time after the step of clamping the mold is completed and before the step of injecting the resin material is initiated, (ii) a cooling time after the step of injecting the resin material is completed and before the step of opening the mold is initiated, and (iii) an intermediate time after the step of opening the mold is completed and before the step of closing the mold is initiated.

In the above preferred form of the method, the time compensation can be effectively executed in the above-indicated time controlled steps (i), (ii), (iii), so that the difference between the measurement of the cycle time and the reference cycle time is effectively compensated or zeroed in these time controlled steps, while an adverse effect of the time compensation on the molded product is effectively minimized or avoided.

It is required that at least one measuring point is set in an optional point in the injection molding cycle. Preferably, a plurality of measuring points (e.g., two, more preferably three or more measuring points) are set in respective points in the cycle. In this case, the method is desirably arranged such that the differences between the measurement of the cycle time and the reference cycle time are detected at respective measuring points, and the time compensation based on the respectively detected differences are executed at the different time controlled steps. In this arrangement, the measurements of the cycle time and the time compensations are executed at the plurality of points in the injection molding cycle. This means that a control of the cycle time can be performed at each time controlled step, resulting in an improved accuracy of the control of the cycle time, and a resultant accuracy of control of the heat history of the resin material and the temperature of the mold. In this arrangement, moreover, an amount of compensation of time to be compensated in one cycle time is effectively divided with the plurality of time controlled steps. This means that an amount of compensation of time in one time compensation action is effectively reduced, thereby reducing adverse effect of the time compensation action on the molded product.

In this respect, it is noted that the time compensation based on the time difference between the measurement of the cycle time and the reference cycle time, which difference is detected in one measuring point, may be executed at one time controlled step in the cycle, or alternatively may be executed at the plurality of time controlled steps in the cycle. The latter case is effective to reduce an amount of compensation of time to be executed in each step, thereby reducing the adverse effect of the time compensation on the quality of the molded product.

In another preferred form of the method, there is determined an upper limit of an amount of compensation of time executed at one time controlled step. In this form of the method of the invention, the presence of the upper limit of the amount of compensation of time is effective to prevent excessively large amount of change in a period of the time controlled step, even in the case where an excessively large amount of difference between the measurement of the cycle time and the reference cycle time is detected in the measuring point, thereby eliminating or minimizing the adverse influence of the time compensation on the operation of the injection molding during the time controlled step. The upper limit of the amount of compensation of time is not particularly limited to the specific value, but may be suitably determined taken into account a tolerable amount of change in the operation time of the time controlled step, a required quality of the product, a degree of influence of the change of the operation time of the time controlled step on the quality of the product, an amount of difference between the measurement of the cycle time and the reference cycle time generated under a standard molding condition, and the like. In a general injection molding apparatus, the upper limit of the amount of the compensation of time is preferably set at about ±0.5 second, more preferably, at about ±0.2 second.

The second object indicated above may be achieved according to a second aspect of the present invention which provides an injection molding apparatus for repeatedly performing an injection molding cycle including the steps of closing and clamping a mold having a mold cavity, injecting a resin material into the mold cavity, cooling and solidifying the resin material filling the mold cavity, and opening the mold so as to remove a molded product, in order to successively form the molded product, the apparatus comprising: (a) a time counter adapted to count a cycle time at at least one measuring point in the injection molding cycle; (b) a calculator adapted to calculate a difference between the cycle time obtained by the time counter and a predetermined reference cycle time; and (c) a compensating means for executing a time compensation on the basis of the difference calculated by the calculator at a time controlled step which is arranged to be executed before the next measuring point comes.

In the injection molding apparatus according to the second aspect of the present invention, the above-described injection molding method according to the first aspect of the present invention is effectively performed. Therefore, the present apparatus is capable of reducing or eliminating an amount of variation in the cycle time of each injection molding cycle, due to the variation of the operation time of the steps which are not controlled based on time, thereby assuring a high stability of the heat history of the resin material and the temperature of the mold in every molding cycle. This arrangement makes it possible to successively form a desired product with a stabilized quality.

While the time counter, the calculator, and the compensation means may be effectively embodied by utilizing a microcomputer, for example. Such a microcomputer may be a microcomputer used as a controller for controlling injection molding operations of the injection molding apparatus.

In one preferred form of the apparatus of the present invention, the apparatus further comprises a reference cycle time setting means for storing and renewing a measurement of the cycle time as the reference cycle time in a suitable memory device based on an inputted signal applied from an external area.

In this case where the present injection molding apparatus is constituted by utilizing a microprocessor, the actual measurement of the cycle time may be stored in a memory device of the microprocessor as the reference cycle time, based on an input signal applied to an input portion of the microprocessor from an external area. The stored cycle time may be renewed also based on the input signal applied to the input portion. This arrangement permits an easy and rapid setting or adjustment of the reference cycle time. For instance a cycle time which is measured when the injection molding apparatus produces a desired product, can be easily set as the reference cycle time, facilitating setting and renewing an appropriate cycle time.

In another preferred form of the apparatus of the present invention, the apparatus further comprises a switch device for allowing or prohibiting execution of the time compensation in the time controlled step or steps. The provision of the switch device permits optionally selecting execution of the time compensation in the injection molding cycle. Therefore, the time compensation can be prohibited in the case where a precise control of time is required in the time controlled step, for example, whereby the adverse effect of the time compensation on the step can be avoided as needed. In the case where the time compensation is executed at the plurality of time controlled steps, a plurality of the switch devices may be provided for the respective time controlled steps.

BRIEF DESCRIPTION OF THE DRAWINGS

The above and other objects, features, advantages and technical and industrial significance of this invention will be better understood by reading the following detailed description of a presently preferred embodiment of the invention, when considered in connection with the accompanying drawings, in which:

FIG. 3 is an explanative view showing steps of one example of a method of an injection molding according to the present invention, which steps are executed by the injection molding unit of FIG. 1.

DETAILED DESCRIPTION OF THE PREFERRED EMBODIMENT

Figure 1:
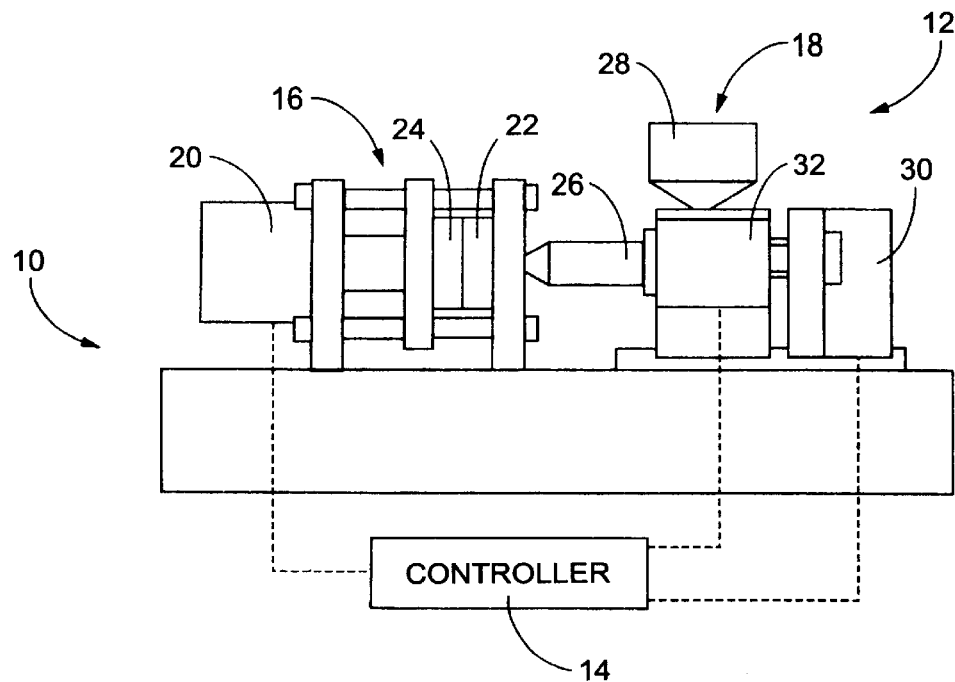
FIG. 1 is a view schematically showing a structure of an injection molding unit constructed according to one preferred embodiment of the present invention.

Referring first to FIG. 1, there is schematically shown a structure of an injection molding unit 10 constructed according to one preferred embodiment of the present invention. The injection molding unit 10 comprises an injection molding apparatus 12 and a controller 14. The injection molding apparatus includes a mold clamping device 16 and an injection device 18 as well known in the art. More specifically described, the mold clamping device 16 has a mold consisting of a stationary mold half 22 and a movable mold half 24 which is movable toward and away from the stationary mold half 22 by means of a hydraulic or electric mold opening and closing device 20. That is, the mold of the mold clamping device 16 has its opening position where the stationary and movable mold halves 22, 24 are spaced apart from each other, and its closing position where the stationary and movable mold halves 22, 24 are brought into contact with each other so as to define therebetween a mold cavity whose configuration corresponds to that of a desired product.

The injection device 18 includes a heating cylinder 26 and an injection screw (not shown) rotatably extending through a bore of the heating cylinder 26. The heating cylinder 26 has an injection nozzle (not shown) at one of its axially opposite ends. The injection nozzle is brought into communication with the mold cavity. In this condition, a resin material stored in a hopper 28 is supplied to the heating cylinder 26 from the other axial end portion of the heating cylinder 26 which is remote from the mold cavity. As the screw is rotated about its axis of rotation by a driving device 30 such as a hydraulic motor, and as the screw is accordingly retracted while applying a back pressure to the resin material, the resin material is transferred toward the injection nozzle, while being heated to be molten or plasticized. Then, the injection screw is moved toward its fully advanced position located in the side of the injection nozzle of the heating cylinder 26, by means of a driving device 32 such as a hydraulic cylinder, so that the molten resin material is injected from the heating cylinder 26 through the injection nozzle 27 into the mold cavity of the mold which is clamped by the suitable clamping device.

Figure 2:
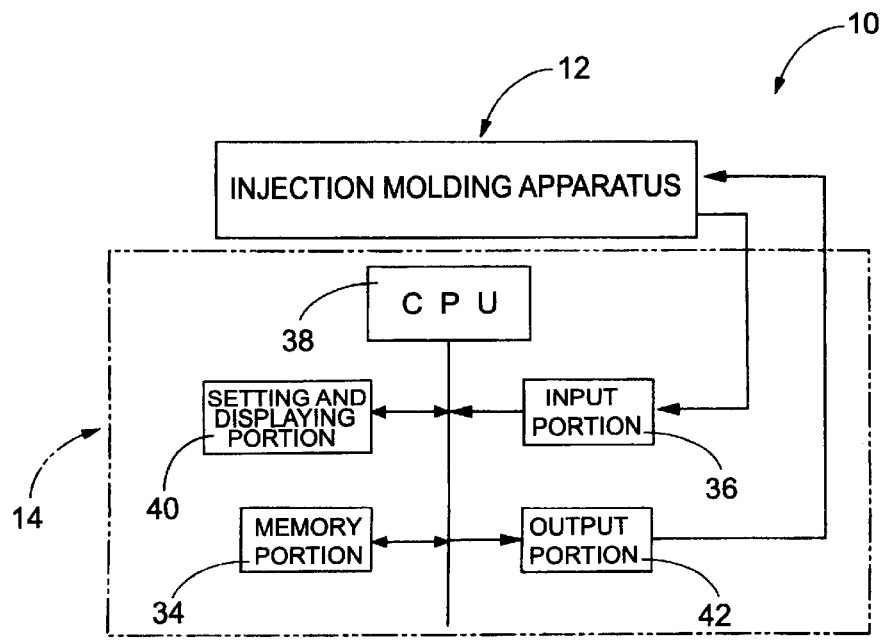
FIG. 2 is a block diagram depicting a control system used in the injection molding unit of FIG. 1.

On the other hand, the controller 14 is operated to control motions of the mold clamping device 16 and the injection device 18 of the injection molding apparatus 12, so that the injection molding apparatus 12 is operated to produce successively desired molded products. The controller 14 may be effectively constituted by a microcomputer, for example. Referring next to FIG. 2, the controller 14 includes a memory portion 34 having a read-only memory (ROM), a random-access memory (RAM), an input portion 36, a CPU 38 as a central processing unit, a setting and display portion 40 and an output portion 42. The memory portion 34 stores control programs for controlling the mold clamping device 16 and the injection molding device 18 and data, and the CPU 38 processes operation signals received from the input portion 36 and the setting and displaying portion 40, according to the control programs stored in the memory portion 34. The CPU 38 generates control signals, which are to be applied to the injection molding apparatus 12 through the output portion 42, so that the injection molding apparatus 12 is feed back-controlled and sequential controlled in order to perform a successive formation of the desired products. The setting and display portion 40 includes a display device so that the operating condition of the injection molding apparatus 12 is displayed on a monitor of the display device of the display portion 40.

Referring next to FIG. 3, there is shown one example of an injection molding cycle executed by the injection molding apparatus 12 during the successive injection molding by the injection molding apparatus 12.

Initially, at a mold closing action initiating point "a" in a injection molding cycle, the controller 14 outputs a mold-closing-action initiation signal to the injection molding device 12, so that a mold opening and closing device 20 is operated to move the movable mold half 24 from its mold closing position where the stationary and movable mold halves 22, 24 are spaced apart from each other, to its mold closing position where the stationary and movably mold halves 22, 24 are held in contact with each other. In general, the moving velocity of the movable mold half 24 during this mold closing operation is suitably controlled such that the movable mold half 24 is decelerated immediately before the movable mold half 24 has reached its mold closing position. Subsequently, after the completion of the mold closing action, the controller 14 outputs a mold-clamping-action initiation signal to the injection molding device 12, so that the mold opening and closing device 20 changes its operation modes so as to apply a mold clamping force between the stationary and movable mold halves 22, 24, whereby the stationary and movable mold halves 22, 24 are forced to each other with an increased pressure. In general, the mold closing and clamping actions are controlled by the controller 14 such that an amount (speed) of discharge of the hydraulic pomp used for operating a hydraulic cylinder of the mold opening and closing device 20 is suitably adjusted. A mold clamping action initiating point "b" in the cycle, at which the mold opening and closing device 20 changes its operation modes from the mold closing operation mode to the mold clamping operation mode, is effectively detected by means of a positioning sensor in the form of a limit switch, for example, which is adapted to detect the mold closing position of the movable mold half 24.

After the completion of the mold clamping operation, then, at a mold clamping action completing point "c" in the cycle, the controller 14 starts to count a predetermined injection delay time for delaying an initiation of a resin material by the injection device, by a suitable timer or time counter. After the predetermined delay time has passed, the controller 14 at an injection action initiating point "d" in the cycle, outputs an injection signal to the injection molding apparatus 12, so that the injection device 18 is operated to execute a molten-resin injection action, whereby the molten resin is injected into the mold cavity defined between the stationary and movable mold halves 22, 24. After the mold cavity is filled with the molten resin, a suitable level of holding pressure is applied to the molten resin in the mold cavity, as needed. The injection action and the holding-pressure applying action are effectively controlled by adjusting a position of the injection screw, an injection pressure or the like.

The injection molding apparatus 12 further includes a positioning sensor in the form of a limit switch, for example, for detecting a fully advanced position of the injection screw of the injection device 18. If the limit switch detects the injection screw has reached its fully advanced position, or alternatively, if a predetermined injection time counted by the timer of the controller 14 has passed, the injection action by the injection device 18 is completed. Then, at an injection action completing point "e" in the cycle time, the controller 14 commands the timer to count a predetermined cooling time. In the mold clamping device 16, during the cooling time, the molten resin filling the mold cavity defined between the stationary and movable mold halved 22, 24 is cooled to be solidified. In the injection apparatus 18, on the other hand, after a predetermined charge delay time period lapses from the point "e" in the cycle, the screw of the injection apparatus 18 is rotated about its rotation axis so that a resin material to be used for the next injection molding cycle is heated to be molten and a predetermined amount of molten resin material is metered and charged. It is arranged that the charging and metering of the resin material is finished before the termination of the cooling time, in the present embodiment.

After the cooling time period expires, at a cooling time completing point "f" in the injection molding cycle, the mold clamping device 16 is operated to initiate its mold opening action. Like in the mold closing action, the mold opening action, in general, is suitably controlled by adjusting the amount (speed) of discharge of the hydraulic pomp used for operating the hydraulic cylinder of the mold opening and closing mechanism 20. The velocity of movable mold half 24 during the mold opening action is suitably controlled on the basis of the position of the movable mold half 24 detected by positioning sensors in the form of limit switches, for example. The mold opening operation is terminated, when the limit switch detect that the movable mold half 24 is placed in its mold opening position.

Subsequently, at a mold opening operation completing point "g" in the cycle, the timer of the controller 14 is operated to count a predetermined intermediate time, while the mold clamping device 16 is operated to eject the molded product from the stationary and movable mold halves 22, 24 by using an ejector device thereof. It may be possible that the ejection of the molded product from the stationary and movable mold halves 22, 24 may be performed by a manual operation, or alternatively may be performed by means of an industrial robot adapted to take out the products.

When the ejection of the product is completed at a ejection completing point "h" in the cycle and the intermediate time period lapses, the process flow of the injection molding cycle goes to the point "a" in the cycle, so that the current molding cycle is terminated and the next molding cycle is immediately started. This injection molding cycle is repeatedly performed as described above to successively form the desired products.

As is apparent from FIG. 3, the illustrated injection molding cycle is arranged such that the intermediate time lapses after the completion of the ejection of the molded product. It may be possible that the ejection of the molded product is terminated after the intermediate time has passed. In this case, the completion of the ejection of the molded product is determined as the point "a" in the cycle time in which the next injection molding cycle is started.

In the illustrated injection molding cycle, a cycle time required for executing one injection molding cycle is measured in every cycle, at at least one point in the cycle time selected from the group consisting of : the mold closing action initiating point "a", the mold clamping action initiating point "b", the mold clamping action completing point "c", the injection action initiating point "d", the injection action completing point "e", the cooling time completing point "f" and the mold opening operation competing point "g". The difference between each measurement and a predetermined reference cycle time is calculated. In this respect, the timer which utilizes a clock of the microcomputer of the controller 14 and the CPU are suitably used for executing the measuring of the cycle time at the predetermined measuring point and the calculation of the difference between the measured cycle time and the predetermined reference cycle time, for example. The predetermined reference cycle time may be manually inputted into the microcomputer of the controller 14 through the setting and displaying portion 40. Alternatively, the reference cycle time may be determined by utilizing a monitoring cycle time which is detected in every injection molding cycle for monitoring the operation of the apparatus in every injection molding cycle. More specifically described, when the injection molding apparatus produces the desired product with high stability, the obtained monitoring cycle time is advantageously stored in the memory portion 34 of the controller 14 as the reference cycle time.

The thus obtained difference between the measured cycle time and the reference cycle time is immediately compensated at any one or more of time controlled steps existing between the current measuring point and the next measuring point in the cycle. The time controlled step is interpreted as a step in which the action of the injection molding apparatus is controlled based on time from the beginning to the end of the step. Specifically, in the present embodiment, the injection delay time indicated between the points "c" and "d", the cooling time indicated between the points "e" and "f", and the intermediate time indicated between the points "g" and "a" are all considered as the time controlled steps. These time controlled steps are executed within predetermined period of times, respectively, so that the detected difference between the measured cycle time and the reference cycle time is effectively offset or compensated by adjusting the predetermined period of times of the time controlled steps, whereby one cycle time of the injection molding cycle is duly adjusted to the reference cycle time.

Described in detail, the cycle time of each injection molding cycle is effectively adjusted, for example, such that the cycle time of the injection molding cycle is measured in the mold clamping action completing point "c", the injection action completing point "e", and the mold opening action completing point "g", respectively. If the difference between the measured cycle time and the reference cycle time is detected at the point "c", then the successive injection delay time indicated between the points "c" and "d" is adjusted to zero or compensate the detected difference. If the difference between the measured cycle time and the reference cycle time is detected at the point "e", then the successive cooling time indicated between the points "e" and "f" is adjusted to zero or compensate the detected difference. Likewise, if the difference between the measured cycle time and the reference cycle time is detected at the point "g", then the successive intermediate time period indicated between the points "g" and "a" is adjusted to zero or compensate the detected difference.

It is noted that the excessively large amount of compensation of the cycle time at one time controlled step may possibly result in an adverse effect on the molded products. Thus, it is desirable to determine a suitable maximum amount of compensation of the cycle time at one compensation opportunity, namely at one time controlled step. The maximum amount of compensation of the cycle time may preferably be set at about ±0.5 second, more preferably, about ±0.2 second. It should be understood that even if the currently detected difference exceeds the predetermined maximum amount of compensation of the cycle time and some of the differences remains to be compensated, the remained difference is again detected as the difference at the next measuring point and immediately compensated at the next time controlled step.

According to the injection molding method of the present embodiment, the cycle time of the injection molding is controlled at the specific points in the injection molding cycle. In this arrangement, the variation of the cycle time generated in the other operation steps in which the action of the injection molding apparatus is not controlled on the basis of time, e.g., the steps in which the operation of the injection molding apparatus is controlled on the basis of the amount of discharge of the hydraulic pump, hydraulic pressures of the hydraulic pump, operating position of the elements of the injection molding apparatus, or the like, is immediately eliminated or compensated in every cycle time.

Therefore, the injection molding method according to the present embodiment makes it possible to hold molding conditions such as the heat history of the resin material and a temperature of the mold, in substantially constant in every injection molding cycle, resulting in effectively successive formation of the desired products having a stabilized quality.

In the present embodiment, a plurality of point in one cycle time, that is, three points "c", "d", "g" are determined as the cycle time measuring points, and the differences detected at respective measuring points are immediately compensated at respective time controlled steps indicated between "c" and "d", between "e" and "f" and between "g" and "a". In this arrangement, not only the entire cycle time but also the times required for executing the respective steps are suitably adjusted to that of the reference cycle time, resulting in a further improved stability of the injection molding operation. Moreover, the difference between the measured cycle time and the reference cycle time generated in one injection molding cycle is divided with the plurality of time controlled steps to be compensated, so that the amount of compensation of time to be treated in each time controlled step can be made smaller, thereby effectively avoiding an adverse effect of the time compensation on the obtained products.

While the presently preferred embodiment of this invention has been described above in detail for the illustrative purpose only, it is to be understood that the present invention is not limited to the details of the illustrated embodiment, but may be otherwise embodied.

In the illustrated embodiment, the present invention is applied to an in-line screw type injection molding apparatus. The present invention may be applicable to other known various types of the injection molding apparatus, such as a plunger (torpedo) type injection molding apparatus and a preplasticating injection molding apparatus.

The points for measuring the cycle time and the operation steps in which the difference between the measured and reference cycle times is compensated are not limited to those of the illustrated embodiment. Further, the number of the measuring points and the steps used for compensating the difference between the measured and reference cycle times is not particularly limited to three in the illustrated embodiment, but may be smaller or larger than three.

It is to be understood that the present invention may be embodied with various other changes, modifications and improvements, which may occur to those skilled in the art, without departing from the spirit and scope of the invention defined in the following claims:

What it claimed is:

1. A method of injection molding for repeatedly performing an injection molding cycle including the steps of closing and clamping a mold having a mold cavity, injecting a resin material into said mold cavity, cooling and solidifying said resin material filling said mold cavity, and opening said mold so as to remove a molded product, in order to successively form said molded product, said method comprising the steps of:

measuring a cycle time at at least one measuring point in said injection molding cycle to thereby obtain a measurement of said cycle time, the at least one measuring point is selected from the group consisting of: the mold closing action initiation point, the mold clamping action initiation point, the mold clamping action completion point, the injection action initiation point, the injection action completion point, the cooling time completion point, and the mold opening operation completion point;

obtaining a difference between said measurement of said cycle time and predetermined reference cycle time; and executing a time compensation, at a time-controlled step, for the entire injection molding cycle on the basis of said difference, the time compensation is arranged to be executed before the next measuring point comes.

2. A method of injection molding according to claim 1, wherein said measuring point may be a point in the injection molding cycle at which an electric signal is generated, said electric signal being utilized to measure said cycle time.

3. A method of injection molding according to claim 1, wherein said reference cycle time is set at a desired value by the manual operation.

4. A method of injection molding according to claim 1, further comprising the step of:

timing said cycle time in every injection molding cycle; and setting said cycle time timed when a desired product is obtained as said reference cycle time.

5. A method of injection molding according to claim 1, wherein said time compensation is executed at at least two of said time controlled steps in said injection molding cycle which steps are independent of each other.

6. A method of injection molding according to claim 1, wherein said cycle time is measured at a plurality of measuring points in said injection molding cycle, and all amount of said difference obtained at at least one of said plurality of measuring points is compensated at said time controlled step which is arranged to be executed before the next measuring point comes.

7. A method of injection molding according to claim 1, wherein said cycle time is measured at a plurality of measuring points in said injection molding cycle, and a part of said difference obtained at at least one of said plurality of measuring points is compensated at said time controlled step which is arranged to be executed before the next measuring point comes.

8. A method of injection molding according to claim 1, wherein said injection molding cycle includes at least one measuring point a plurality of said time controlled steps arranged be executed before the next measuring point comes, while said difference obtained at said measuring point is divided with said plurality of said time controlled steps to be compensated.

9. A method of injection molding according to claim 1, wherein an upper limit of an amount of compensation of time executed at one of said time-controlled step is determined.

10. A method of injection molding for repeatedly performing an injection molding cycle including the steps of closing and clamping a mold having a mold cavity, injecting a resin material into said mold cavity, cooling and solidifying said resin material filling said mold cavity, and opening said mold so as to remove a molded product, in order to successively form said molded product, said method comprising the steps of:

measuring a cycle time at at least one measuring point in said injection molding cycle to thereby obtain a measurement of said cycle time, the at least one measuring point is selected from the group consisting of: the mold closing action initiation point, the mold clamping action initiation point, the mold clamping action completion point, the injection action initiation point, the injection action completion point, the cooling time completion point, and the mold opening operation completion point;

obtaining a difference between said measurement of said cycle time and a predetermined reference cycle time; and executing a time compensation, at a time-controlled step, for the entire injection molding cycle on the basis of said difference, the time compensation is arranged to be executed before the next measuring point comes, wherein said time-controlled step at which said time compensation is executed, is selected from the group consisting of: (i) an injection delay time after said step of clamping said mold is completed and before said step of injecting said resin material is initiated; (ii) a cooling time after said step of injecting said resin material is completed and before said step of opening said mold is initiated; and (iii) an intermediate time after said step of opening said mold is completed and before said step of closing said mold is initiated.

11. An injection molding apparatus for repeatedly performing an injection molding cycle including the steps of closing and clamping a mold having a mold cavity, injecting a resin material into said mold cavity, cooling and solidifying said resin material filling said mold cavity, and opening said mold so as to remove a molded product, in order to successively form said molded product, said apparatus comprising:

a time counter adapted to count a cycle time at at least one measuring point in said cycle time, the at least one measuring point is selected from the group consisting of: the mold closing action initiation point, the mold clamping action initiation point, the mold clamping action completion point, the injection action initiation point, the injection action completion point, the cooling time completion point, and the mold opening operation completion point;

a calculator adapted to calculate a difference between said cycle time obtained by said time counter and a predetermined reference cycle time; and a compensating means for executing a time compensation, at a time-controlled step, for the entire injection molding cycle on the basis of said difference calculated by said calculator, the time compensation is arranged to be executed before the next measuring point comes.

12. An injection molding apparatus according to claim 11, further comprising a reference cycle time setting means for storing and renewing a measurement of said cycle time as said reference cycle time in a suitable memory device, based on an input signal applied from an external area.

13. An injection molding apparatus according to claim 11, further comprising a switch device for allowing or prohibiting execution of said time compensation in said time controlled step.

* * * * *